(12) United States Patent
Wennrich et al.

(10) Patent No.: US 7,773,940 B2
(45) Date of Patent: Aug. 10, 2010

(54) METHOD FOR DATA TRANSMISSION, WRITE/READ STATION FOR IMPLEMENTING THE METHOD, AND FUNCTIONAL UNIT

(75) Inventors: Andreas Wennrich, Limburg (DE); Markus Desch, Nierdernhausen (DE)

(73) Assignee: Feig Electronic GmbH, Weilburg-Waldhausen (DE)

( * ) Notice: Subject to any disclaimer, the term of this patent is extended or adjusted under 35 U.S.C. 154(b) by 809 days.

(21) Appl. No.: 10/889,537

(22) Filed: Jul. 12, 2004

(65) Prior Publication Data

US 2005/0012596 A1 Jan. 20, 2005

(30) Foreign Application Priority Data

Jul. 14, 2003 (EP) .................... 03015951

(51) Int. Cl.
  *H04B 7/00* (2006.01)
(52) U.S. Cl. ............. 455/11.1; 455/41.2; 340/10.3
(58) Field of Classification Search ............. 455/41.2, 455/11.1; 340/10.3, 572
See application file for complete search history.

(56) References Cited

U.S. PATENT DOCUMENTS 5,929,760 A * 7/1999 Monahan ............. 340/572.7
6,694,125 B2 * 2/2004 White et al. ........... 455/16
6,717,516 B2 * 4/2004 Bridgelall ............. 340/572.1
2003/0001726 A1 1/2003 Moore

FOREIGN PATENT DOCUMENTS

EP 1 139 277 10/2001
EP 1 298 573 4/2003

OTHER PUBLICATIONS

Klaus Finkenzeller, RFID Handbook, May 23, 2003, Carl Hanser Verlag, Munich/FRG, 2nd Edition, pp. 1-274.*
European Search Report, dated: Dec. 11, 2003.

* cited by examiner

*Primary Examiner*—Yuwen Pan
(74) *Attorney, Agent, or Firm*—Collard & Roe, P.C.

(57) ABSTRACT

A method for data transmission between a write/read station of a radio frequency identification system and at least one external functional unit sends at least one data block from the write/read station to the external functional unit. The transmitted data block is received by at least one of the external functional units, and after reception of the transmitted data block, at least one external functional unit evaluates the at least one data block. The transmission of the at least one data block takes place exclusively by way of an RFID communication connection from the write/read station to the at least one functional unit and/or back.

19 Claims, 2 Drawing Sheets

METHOD FOR DATA TRANSMISSION, WRITE/READ STATION FOR IMPLEMENTING THE METHOD, AND FUNCTIONAL UNIT

CROSS REFERENCE TO RELATED APPLICATIONS

Applicants claim priority under 35 U.S.C. §119 of European Application No. EP03/015951.1 filed Jul. 14, 2003.

BACKGROUND OF THE INVENTION

1. Field of the Invention

The present invention relates to a method for data transmission, a write/read station for implementing the method, and a functional unit.

2. The Prior Art

In some known RFID (radio frequency identification) systems, the antenna for communication with the transponder is separated from a read/write station (reader), by means of a line that is generally configured as a coaxial cable. Such arrangements are mainly found where passive transponders are supposed to be read or written over relatively long distances, i.e. 0.7 to 1.5 meters, for example.

In such applications, other components are frequently necessary, in addition to the write/read station and the antenna. Thus, for example, so-called equalization devices or multiplexers are frequently required.

The task of an equalization device is, for example, to hold the antenna at a specific resonance frequency. On the other hand, the equalization device is allowed to perform the antenna equalization only if no communication is active between write/read station and transponder at the time.

Using a multiplexer, several antennas can be connected with a write/read station, and can be turned on one after the other.

Such and related devices are arranged somewhere between the write/read station and the antenna, in each instance, and must be controlled by the write/read station in suitable manner. According to the state of the art, control lines, which are implemented as additional connections between write/read station and external functional unit, were needed until now. This requirement has the disadvantage that an additional hardware expenditure is necessary and that additional installation effort is incurred in the installation of such an RFID system, as a result of which additional error sources can come about.

Furthermore, according to the state of the art, attempts have been made to control external functional units by means of simple pulses that interrupt the carrier signal for a defined period of time, or by means of direct voltages that are superimposed on the carrier signal. The disadvantage in the case of control by means of simple pulses or direct voltage, however, is that the write/read station needs additional hardware. Also, the control generally functions in only one direction, namely from the write/read station to the external functional unit. In addition, in the case of this method, no complex data or commands can be transmitted, which has the disadvantage, for example in the case of a multiplexer, that only sequential but not targeted relaying of the multiplexer outputs is possible. Furthermore, in the two methods stated, there is the risk that the emitted frequency spectrum of the RFID system will be changed by transmission of the pulses, in a manner that the limit values regulated by means of broadcasting regulations will be exceeded.

SUMMARY OF THE INVENTION

It is an object of the present invention to provide a method for data transmission between a write/read station of an RFID system and at least one external functional unit, which does not demonstrate the named disadvantages. It is also an object to provide a write/read station for implementing the method, as well as a functional unit These and other objects are achieved by means of a method in which the transmission of the at least one data block takes place exclusively by way of an RFID communication from the write/read station to the at least one functional unit and/or back.

In another aspect, a write/read station is provided for implementing the method. The write/read station has a modulation device for modulation of the carrier signal for the data block to be sent to the at least one functional unit which is simultaneously used to modulate the data to a data carrier.

In a further aspect, a functional unit for communicating with a write/read station according to the method is provided wherein at least one data block is received by the write/read station, and at least one received data block has a receiving and/or sending device, and the transmission of at least one data block is configured as a transmission that takes place exclusively by way of an RFID communication connection from the write/read station to the at least one functional unit and/or back.

Because at least one data block is sent from the write/read station to the external functional unit in the method according to the invention, for data transmission between a write/read station of an RFID system and at least one external functional unit, and because the transmitted data block is received by at least one of the external functional units, and after reception of the transmitted data block, at least one external functional unit evaluates the at least one data block, as well as because the transmission of the at least one data block takes place exclusively by way of an RFID communication connection from the write/read station to the at least one functional unit and/or back, the RFID communication connection that exists in any case is utilized. As a result, no additional hardware expenditure at the write/read station and no additional connection between the write/read station and the functional unit are necessary.

According to a particularly preferred embodiment, maximally one modified firmware is used at the write/read station, in order to be able to communicate with the "new" external functional units, since all the other components are already present in the write/read station.

For the communication between the write/read station and the at least one external functional unit, the same physical and data-technology transmission channel is utilized. By way of this transmission channel, the data are interchanged bidirectionally between the transponder and the write/read station according to the state of the art. In other words, the external functional units receive the commands in the same form as they are sent to the transponder. The same line and, in advantageous manner, the same coding, the same type of modulation, and so forth, are used.

The RFID communication connection is advantageously configured as a connection with a cable. However, it is also possible to provide a wireless connection.

For the external functional units, the following units are mentioned merely as examples: multiplexer, tuner, power splitter, transformer, signal unit, sensor.

The write/read station transmits data blocks by way of the RFID communication connection, and at least one external functional unit receives these data blocks. The external functional unit evaluates the data of the write/read station. If the evaluation in the external functional unit results in the data triggering actions in the receiving external functional unit, the external functional unit can send reply data back to the write/read station, using the RFID communication connection. These reply data can be received by means of the reception circuit for transponder data of the write/read station.

An advantage of the method according to the invention is that the hardware of the write/read station can be utilized directly in order to turn on external functional units or to send data to them, without additional hardware having to be provided in the write/read station.

Furthermore, complex data can be transmitted. In addition, it is possible to verify the data by means of communication frames, plausibility checks, and checksums. Another advantage of the invention is that precise control and addressing of a plurality of functional units is possible.

Another important advantage of the invention is that the transmission of analog variables takes place with digital coding. Furthermore, transmission in both directions, i.e. from the write/read station to the external functional unit and/or back, is possible.

In addition, the invention guarantees that the frequency spectrum emitted by the RFID system remains practically uninfluenced as compared to prior art RFID systems which do not have the possibility of controlling external functional units. The lack of effect on the frequency spectrum occurs because the invention uses the same methods and devices, such as modulation devices and coding devices, as the RFID systems that belong to the state of the art. The emitted frequency spectrum is dependent on the type of modulation (amplitude modulation, frequency modulation, or phase modulation), on the modulation depth, and on the type of data coding. In addition to the carrier signal generated by the cycle signal generator, it has so-called side bands. Furthermore, various harmonics can occur in the data transmission system, which are then also an integral part of the emitted frequency spectrum. The coding is described, among other things, by the width of the modulated pulses and the number and frequency of the pulses. The limits for the value of the carrier signal, the side bands, and the harmonics in the emitted frequency spectrum are regulated by broadcasting regulations.

The particular advantages of the invention will be explained in greater detail below, on the basis of the control of a multiplexer.

The write/read station sends data blocks to the external functional unit, which is configured as a multiplexer in the present example, by way of the RFID communication connection. The multiplexer has a receiver part that corresponds to the receiver part of a transponder in parts of the function. The signal of the write/read station is configured, in this connection, so that it can be processed by the receiver of a multiplexer or a transponder.

The use of the method according to the invention in multiplexers has the advantage that the sequence of the control of the antennas can be selected as desired. In the case of known multiplexers, which can be turned on by the write/read station by way of a normal control line, the antennas can be switched through only in sequence. According to the invention, however, the sequence of turning on the antennas can be selected as desired.

Furthermore, using the method according to the invention, relaying to the next antenna can be set to take place only if it is actually intended. This capability is advantageous, for example, in the case of a power failure. In the case of a power failure, the prior art multiplexer receives a pulse when the current is turned on again, and relays to the next antenna. This arrangement has the disadvantage that, for one thing, an antenna whose turn has not yet come is switched on, and for another, it cannot be checked which antenna is being turned on.

According to the invention, it is possible that the multiplexer switches to a selected antenna, for example the antenna that was the last to be turned on before the power failure. It is also possible that the multiplexer switches to a "zero point," for example to the first antenna. It is also possible to read off, by way of the back-transmission of the data to the write/read station, which antenna is just being addressed.

In the implementation of an antenna equalization, as well, it is required to obtain feedback about the functional unit to the write/read station.

A data protocol is sent to the at least one functional unit by the write/read station. This protocol is a complete data protocol. This feature has the advantage that a transponder that also receives the data protocol receives a data protocol that corresponds to the usual data protocol. The transponder therefore checks the data protocol and after having checked it, determines whether or not it was being addressed.

The selection of transponder-compatible data blocks is advantageous, since the transponder checks the protocol completely and either performs an action, or not, on the basis of this check. On the other hand, if the transponder were to receive data blocks that it cannot read, or can read only in part, the transponder might begin with reception, i.e. with checking the data blocks, and then find that the data blocks were not intended for it, or are defective. However, the time at which the transponder makes this determination can lie clearly after the end of the data block. In this case, the transponder will be blocked from further communication for the time after the end of the receiving data block, until the time when the data block error is recognized. In some other cases, for example in the case of certain transponder types, the transponder has to be completely reset after an incorrect data block was received, before it can receive new data blocks.

Another aim of the invention is not to interfere with the transponder or transponders in the acquisition region of the write/read station, by means of transmitted signals, or not to influence the state of the transponder. In the case of communication of several transponders with one read station, the transponders assume different states, for example. Transponders that newly come into the acquisition region of a write/read station are in a so-called READY STATE, for example. In this state, the transponders are ready, for example, to run through commands for a so-called anti-collision procedure. In the anti-collision procedure, the data collisions between several transponders in the acquisition region of the write/read station can be resolved, and the serial number of the transponders can be determined. Transponders whose serial number was determined then switch over into a state in which they no longer take part in the anti-collision procedure, for example. If the transponder leaves this state, in which it no longer participates in the anti-collision procedure, due to incorrect data blocks, for example, the identified transponders participate in the anti-collision procedure again. This process results in a clearly longer anti-collision procedure.

Another example of a transponder state occurs in the case of transponders having security functions. In the case of these transponders, an authentication is generally carried out before the actual data exchange. If an authenticated transponder receives incorrect data blocks, it can leave the state of data exchange, for example, since the transponder interprets the incorrect data block as a manipulation attempt. Incorrect data blocks can be for example, data blocks with incorrect checksums, missing end characters, incorrect protocol lengths, partial data blocks, or even only individual bits, i.e. modulation pulses. In the case of the modulation pulses, the pulse width very often plays a decisive role. Thus, some transponders interpret pulses that have a greater pulse width than the actual data pulses as a reset command.

A particular variant for avoiding problems with the transponders is the use of a so-called manufacturer ID to address the external functional units. In some transponder systems, transponders that use a manufacturer ID for certain commands, in order to determine whether a command is intended for this transponder, are used. In a preferred embodiment of the invention, the external functional units are addressed by a specific manufacturer ID, in order to thereby avoid problems with the transponders.

According to another advantageous embodiment of the invention, the write/read station is structured so that it can pass data blocks from the host to the functional unit or from the functional unit to the host. This function can be implemented in different embodiments.

One possibility is so-called transparent communication. Here, the data sent by the host are sent to the functional units or the transponders directly, by way of the RFID communication connection. In other words, the data blocks sent by the host are already fed into the write/read station as a bit stream, to a great extent, in a manner that the write/read station merely has to recode the bits sent by way of the host protocol into the bit coding of the RFID communication connection. The write/read station then can send them by way of the RFID communication connection.

In this connection, specially coded parts of the RFID communication protocol, such as start of frame, are inserted into the data block that is being sent to the functional units or transponders by the write/read station, by way of the RFID communication connection. In the case of transparent communication, the write/read station can also receive data blocks of a functional unit, and pass the received bit stream on to the host, essentially unchanged. In other words, even when relaying received data blocks of functional units, only RFID-communication-specific parts of the information of the data block, such as start of frame, for example, are removed, but essential parts of the information of the data block are passed on to the functional unit by the write/read station, as a bit stream. In order to be able to use transparent communication without changes in the write/read station, it is important that the functional units possess the same response behavior as the transponders. This requirement means that a version of the functional unit, which permits transparent communication without changes to the reader firmware, reacts to a data block intended for the functional unit and sent by the write/read station, with the same time behavior as a transponder of the corresponding RFID system. The same time behavior means that not only are the data coded the same way in terms of time, but also the response data occur at the same time or in the time raster as the transponder response.

Another possibility of relaying or passing through data from the host to the functional unit, or data from the functional unit to the host, is the integration of control commands into the host protocol of the write/read station to control and monitor the functional units. In the case of this form of implementation, data sent by the host are converted to the corresponding data blocks for the functional unit, i.e. the response data blocks of the functional units are converged to data for the host.

Examples for applications of the communication and relaying method for data between the host and the functional unit, as described above, are, among others, control of a multiplexer by the host, so that the host can determine, at any time, what antenna of the RFID system is activated, or the host can determine, by means of a query, what outputs of the multiplexer are active at a specific time, and thereby determine by what antenna transponders are currently being read. Another application example is the control of signal transmitters, such as LEDs or summers, which are connected with a functional unit in the antenna.

However, the functional unit may also be controlled directly, by means of the write/read station. In other words, a write/read station possesses its own control device, which is advantageously integrated into the data processing device with which the write/read station can control and monitor the functional units. Examples of such procedures controlled by the write/read station are control of the antenna equalization of an antenna of the RFID system in that the write/read station sends a data block to the "antenna equalization" functional unit by way of the RFID communication connection, after it has been determined that an incorrect equalization of the antenna is present; this data block has the result, in the "antenna equalization" functional unit, of changing the equalization of the antenna. This procedure can be repeated until the incorrect equalization of the antenna has been corrected.

The method according to the invention can also be used in multi-frequency readers.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings.

DETAILED DESCRIPTION OF PREFERRED EMBODIMENTS

Figure 1:
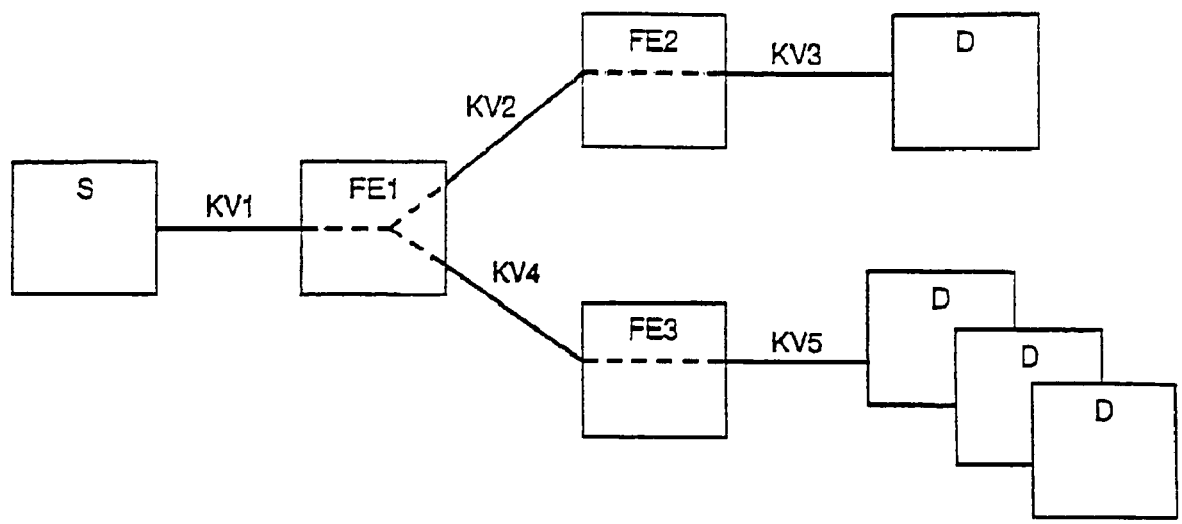
FIG. 1 is a block schematic of a communication system.

FIG. 1 shows a block schematic of a communication system made up of a write/read station S, external functional units FE1, FE2, FE3, and transponders that are referred to as data carriers D.

Write/read station S is provided and configured with a plurality of data carriers D and several external functional units FE1, FE2, FE3 for communication, via communication connections. Communication connections KV1, KV2, KV4 are configured as cable connections with coaxial cables. The communication connections KV3, KV5 are configured as wireless or contact-free data transmission connections.

Communication mainly takes place in the form of data blocks, whereby each data block consists of a predetermined number of bytes, each byte consisting of a predetermined number of bits.

The write/read station S sends data blocks to the external functional units FE1, FE2, FE3 or data carriers D, by way of the communication connections KV1, KV2, KV3. The data blocks are processed in the corresponding external functional units FE1, FE2, FE3 or data carriers D. The corresponding external functional units FE1, FE2, FE3 or data carriers D send data blocks back to the write/read station, by way of the communication connections KV1, KV2, KV3, KV4, KV5.

Figure 2:
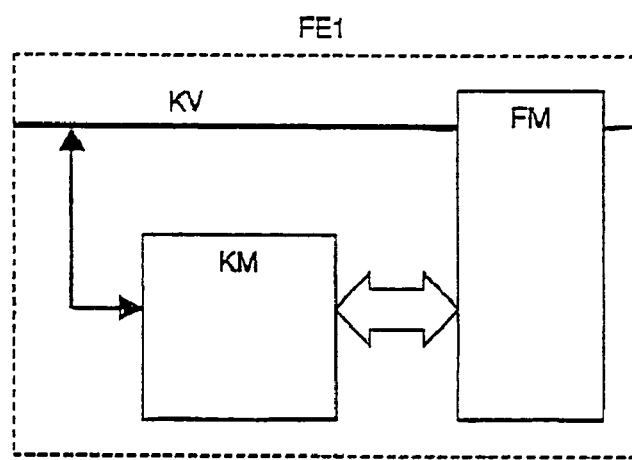
FIG. 2 is a block schematic of an external functional unit.

FIG. 2 shows the external functional unit FE1. It is made up of a communication means KM, which will still be described in greater detail in FIG. 3, and a function means FM, which are configured, for example, as multiplexer, antenna equalization, power splitter, transformer, signal unit, or sensor.

Figure 3:
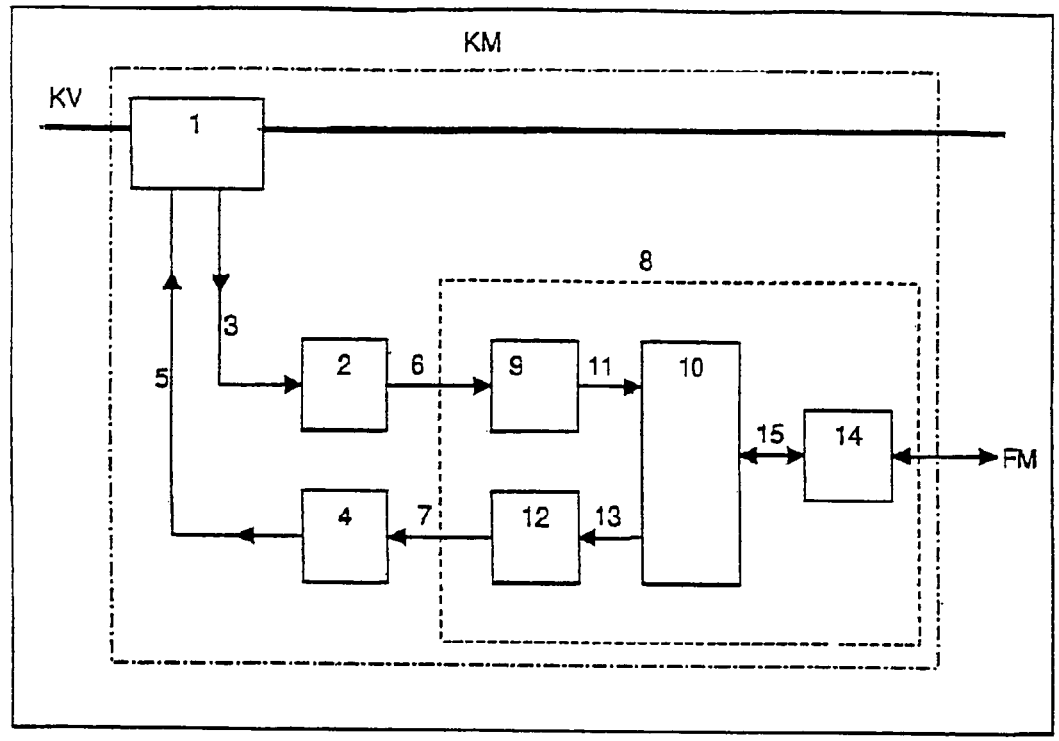
FIG. 3 shows the communication means (KM) of the functional unit of FIG. 2.

FIG. 3 shows the communication means KM, which is configured for communicating with the RFID write/read stations. The communication means KM contains a receiving/sending device 1, which is configured both for receiving and for sending data blocks, whereby the signal from the communication connection KV to and from the data carrier is not changed at all, or only changed insignificantly.

The communication means KM contains a demodulation device 2, for example an amplitude demodulation device, which is connected with the receiving/sending device 1 by way of a connection 3. Using the demodulation device 2, the amplitude-modulated carrier signal transmitted by the write/read station and received with the receiving/sending device 1 can be demodulated.

The communication means KM furthermore contains a load modulation device 4, with which a load modulation of the unmodulated carrier signal can be carried out. The load modulation device 4 is connected with the receiving/sending device 1 by way of a connection 5.

The communication means KM furthermore contains an integrated circuit 8 that is connected with the demodulation device 2 by way of a connection 6, and with the load modulation device 4 by way of a connection 7. The integrated circuit 8 contains a decoding device 9, which is provided for decoding data blocks, and a coding device 12, which is provided for coding data blocks. The data blocks are evaluated using a data processing device 10. Data processing device 10 is connected via a connection 11 with decoding device 9 and via connection 13 with coding device 12. The data processing device 10 can read in and adjust the inputs and outputs 14 of the integrated circuit 8 by way of a connection 15.

Figure 4:
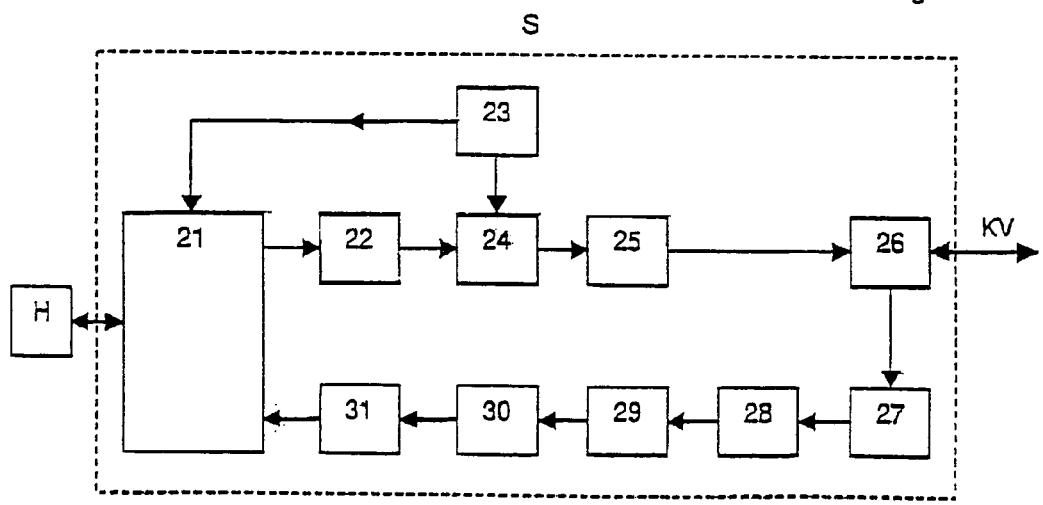
FIG. 4 is a block schematic of the essential parts of a write/read station.

FIG. 4 shows the block schematic of the essential parts of the write/read station S, which is configured for communication with data carriers D and external functional units FE1, FE2, FE3.

The communication between write/read station S and external functional units FE1, FE2, FE3 or between the write/read station S and the data carriers D mainly takes place in the form of data blocks. Each data block is made up of a predetermined number of bytes or bits.

The write/read station S has a data processing device 21. Sequence control devices, logic devices, control devices, and memory devices, not shown, are contained in the data processing device 21.

The write/read station S furthermore contains a cycle signal generator 23 that generates a cycle signal and a carrier signal having the corresponding carrier frequency. The cycle signal is passed to the data processing device 21.

The generated carrier signal is passed to a modulation device 24.

The write/read station S furthermore has a coding device 22, to which data blocks generated using the data processing device 21 are passed. The control of the coding device 22 can also take place by way of the data processing device 21. The coding device 22 ensures coding of the data blocks fed in. The coded data blocks are passed to modulation device 24. In case no coded data blocks are supplied by coding device 22, modulation device 24 emits the unmodulated carrier signal.

The modulated and the unmodulated carrier signal are passed to a transmission amplifier 25. The signal amplified by transmission amplifier 25 reaches communication connection KV by way of a coupling device 26.

The signal on communication connection KV, which is either unmodulated or modulated by the write/read station, the data carrier, or the external functional unit, can be uncoupled by way of coupling device 26.

Below, the processing of signals that are modulated by external functional units or transponders will now be considered.

Write/read station S additionally has an input filter device 27 that is connected with coupling device 26. After filtering of the modulated carrier signal, the filtered signal can be passed to a demodulation device 28. After the first demodulation, this signal is an auxiliary carrier signal, for example, which is coded in accordance with a "Manchester Code," a "Miller Code," a "Differential Biphase Code," or according to other coding methods.

Write/read station S contains an intermediate frequency amplification device 29, which amplifies the auxiliary carrier signal and passes it to another demodulation device 30 in amplified form. The data signal, which is coded in accordance with a "Manchester Code," a "Miller Code," a "Differential Biphase Code," or according to other coding methods, is generated without auxiliary data carrier, by way of demodulation device 30.

The coded data signal without auxiliary data carrier can be passed to a decoding device 31. The data blocks decoded by decoding device 31 can reach data processing device 21.

It is furthermore possible to communicate with a host H by way of data processing device 21, by way of an interface that is not shown here. In this connection, data blocks can be sent from host H to the write/read station. These data blocks include data blocks for communication with write/read station S, data blocks for controlling the transponders, and data blocks for communicating with external functional units. Data blocks that are sent from the transponders or external functional units to the write/read station can reach host H from write/read station S.

In the above description of the system, it was assumed that the response data blocks of the external functional units and the transponders are modulated with an auxiliary carrier. However, the invention is not limited to the use of an auxiliary carrier. In the case of modulation of the data blocks without using an auxiliary carrier, demodulation device 28 and intermediate frequency amplification device 29 of the write/read station can be eliminated.

Figure 5:
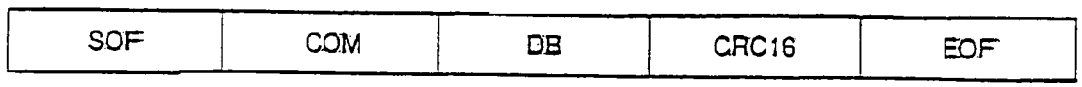
FIG. 5 an example for a protocol of a data block.

FIG. 5 shows an example of a protocol for implementing the communication between the write/read station S and an external functional unit FE1.

The protocol consists of the protocol frame, which is composed of the start of frame SOF, the command bytes COM, a checksum CRC16, and the end of frame EOF. In addition, a data block DB is present. The protocol for communication between the write/read station S and the external functional unit FE is structured so that it does not interfere with or influence a data carrier.

If a write/read station S sends a protocol that is intended for an external functional unit FE, the protocol is sent by way of the communication connection KV according to FIG. 3. The protocol is received by communication means KM with receiving/sending device 1, demodulated with demodulation device 2, decoded with decoding device 9, and processed with data processing device 10.

A protocol can be sent back to the write/read station by way of the communication connection KV, by way of the coding device 12 and the load modulation device 4, by way of the receiving/sending device 1.

In this connection, the protocol that is sent back can have the same structure as the protocol described in FIG. 5.

Although several embodiments of the present invention have been shown and described, it is to be understood that many changes and modifications may be made thereunto without departing from the spirit and scope of the invention as defined in the appended claims.

What is claimed is:

1. A method for data transmission between a write/read station of a radio frequency identification system and at least one external functional unit arranged at any point in a communication connection between the write/read station and an antenna, the communication connection being configured as a cable connection, the method comprising the steps of:
    (a) sending at least one data block from the write/read station to the at least one external functional unit for receipt by the at least one external functional unit, wherein the at least one external functional unit receives commands with the same coding and the same type of modulation that the commands have when the commands are sent to a transponder; and
    (b) following reception of the transmitted at least one data block, evaluating the at least one data block by the at least one external functional unit;
    wherein transmission of the at least one data block takes place exclusively by way of a radio frequency identification communication connection with a cable from the write/read station to the at least one external functional unit or from the at least one external functional unit to the write/read station.

2. The method according to claim 1, wherein the at least one data block to be sent to the at least one external functional unit is passed to a modulation device of the write/read station of the radio frequency identification system, for modulation of a carrier signal, and the at least one data block is sent to the at least one external functional unit.

3. The method according to claim 1, wherein the at least one data block to be sent to the at least one external functional unit is passed to a coding device of the write/read station of the radio frequency identification system, for coding of the data, and the at least one data block is sent to the at least one external functional unit.

4. The method according to claim 2, wherein the modulation device of the write/read station modulates the at least one data block to be sent to the at least one external functional unit in a manner that in case of intentional or unintentional reception by a data carrier, the data carrier remains unaffected by the at least one data block.

5. The method according to claim 3, wherein the coding device of the write/read station codes the data block to be sent to the at least one external functional unit in a manner that in case of intentional or unintentional reception by a data carrier, the data carrier remains unaffected by the at least one data block.

6. The method according to claim 1, wherein the radio frequency identification system emits a frequency spectrum that remains unchanged or does not change beyond prescribed limit values by data bits to be modulated by way of a modulation device of the write/read station or coded by way of a coding device of the write/read station.

7. The method according to claim 1, wherein the at least one external functional unit transmits at least one data block to the write/read station by way of a modulation device.

8. The method according to claim 7, wherein the modulation device is configured as a load modulation device.

9. The method according to claim 1, wherein the at least one external functional unit transmits at least one data block to the write/read station by way of a coding device.

10. The method according to claim 9, wherein the at least one external functional unit codes at least one data block by means of the coding device and transmits it to the write/read station in a manner that the at least one data block can be decoded by the write/read station, by means of a decoding device configured for decoding response data of a data carrier.

11. The method according to claim 1, wherein the at least one external functional unit transmits at least one data block having a response behavior equal to a transponder to the write/read station, and the at least one data block can be evaluated before the write/read station, by means of a decoding device configured for decoding response data of a data carrier.

12. The method according to claim 1, wherein the at least one data block or a response data block has a protocol frame.

13. The method according to claim 12, wherein the at least one data block or the response data block has a start of frame and an end of frame.

14. The method according to claim 12, wherein the at least one data block or the response data block has at least one check block.

15. The method according to claim 12, wherein the at least one data block includes a command block, a parameter block, and data.

16. The method according to claim 15, wherein the parameter block contains a manufacturer identification code.

17. The method according to claim 12, wherein the response data block has at least one status block.

18. The method according to claim 1, wherein the at least one data block is switched through or relayed from a host to the at least one external functional unit or from the at least one external functional unit to the host, unchanged or essentially unchanged.

19. The method according to claim 1, wherein the write/read station relays or switches through data from a host to the at least one external functional unit or data from the at least one external functional unit to the host, whereby control commands for the write/read station are provided in a host protocol, for controlling and monitoring the at least one external functional unit.

* * * * *